US010737335B2

(12) United States Patent
Schmidt et al.

(10) Patent No.: US 10,737,335 B2
(45) Date of Patent: Aug. 11, 2020

(54) KEY DUPLICATION SYSTEM WITH KEY BLANK ORIENTATION DETECTION FEATURES

(71) Applicant: The Hillman Group, Inc., Cincinnati, OH (US)

(72) Inventors: Michael Schmidt, Gilbert, AZ (US); Byron Grice, Phoenix, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

(21) Appl. No.: 15/919,693

(22) Filed: Mar. 13, 2018

(65) Prior Publication Data
US 2018/0264561 A1    Sep. 20, 2018

Related U.S. Application Data

(60) Provisional application No. 62/472,961, filed on Mar. 17, 2017.

(51) Int. Cl.
*B23C 3/35*     (2006.01)
(52) U.S. Cl.
CPC ............... *B23C 3/35* (2013.01); *B23C 3/355* (2013.01); *B23C 2235/28* (2013.01); *B23C 2235/32* (2013.01)
(58) Field of Classification Search
CPC ....... B23C 3/35; B23C 3/355; B23C 2235/24; B23C 2235/28; B23C 2235/32; B23C 2235/12; B23C 2235/21; B23C 2235/48; Y10T 409/300952; Y10T 409/301008; Y10T 409/301064
See application file for complete search history.

(56) References Cited

U.S. PATENT DOCUMENTS 488,058 A    12/1892 Breed
1,135,676 A    4/1915 Engelbert
(Continued)

FOREIGN PATENT DOCUMENTS

CA    2365738 A1    9/2000
DE    102005027102 A1    12/2006
(Continued)

OTHER PUBLICATIONS

International Search Report dated Nov. 12, 2014 listing PCT/US2014/049740 filed Aug. 5, 2014.
(Continued)

*Primary Examiner* — Alan Snyder
*Assistant Examiner* — Yasir A Diab
(74) *Attorney, Agent, or Firm* — Finnegan, Henderson, Farabow, Garrett & Dunner, LLP

(57) ABSTRACT

Systems and methods for duplicating keys are disclosed. A key duplication system receives a key blank into a key receiving module. The key receiving module includes opposable jaws that assist with alignment of the key blank within the module. The key receiving module also includes an end stop that engages the tip of the received key blank and is linearly displaced as the key blank is further inserted. The linear displacement of the end stop is compared to a known value corresponding to a length of the shank of the key blank, and if the displacement does not match the known value, the user is instructed to re-orient the key blank.

15 Claims, 11 Drawing Sheets

(56) References Cited

U.S. PATENT DOCUMENTS

| | | |
|---|---|---|
| 1,165,099 A | 12/1915 | Hoernel |
| 1,243,810 A | 10/1917 | Christoph |
| 1,400,678 A | 12/1921 | Holbrook |
| 1,422,155 A | 7/1922 | Wetherholt |
| 1,462,150 A | 7/1923 | Segal |
| 1,587,181 A | 6/1926 | Pomeroy et al. |
| 1,614,852 A | 1/1927 | Scharf |
| 1,656,295 A | 1/1928 | Schechter |
| 1,697,747 A | 1/1929 | Bachmann |
| 1,752,668 A | 4/1930 | Johnson |
| 1,800,209 A | 4/1931 | Christopherson |
| 1,811,922 A | 6/1931 | Falk |
| 1,869,631 A | 8/1932 | Swanson |
| 2,095,196 A | 10/1937 | Paquette |
| 2,148,667 A | 2/1939 | Yoskowitz et al. |
| 2,582,012 A * | 1/1952 | Currier .................. B23C 3/35 409/83 |
| 2,682,809 A | 7/1954 | May |
| 2,712,769 A | 7/1955 | Prescott |
| 2,821,064 A | 1/1958 | Nelson |
| 3,116,665 A | 1/1964 | Reisner |
| 3,265,245 A | 8/1966 | Harden |
| 3,323,420 A | 6/1967 | Roxburgh |
| 3,358,561 A | 12/1967 | Roxburgh et al. |
| 3,413,892 A | 12/1968 | Casey et al. |
| 3,442,174 A | 5/1969 | Weiner et al. |
| 3,496,636 A | 2/1970 | Lieptz |
| 3,602,092 A | 8/1971 | Richens |
| 3,682,041 A | 8/1972 | Essig |
| 3,748,940 A | 7/1973 | Muri |
| 3,780,550 A | 12/1973 | Simorghi |
| 3,796,130 A | 3/1974 | Gartner |
| 3,797,291 A | 3/1974 | Simorghi |
| 3,865,011 A | 2/1975 | Patriquin |
| 3,978,764 A | 9/1976 | Patriquin |
| 4,055,880 A | 11/1977 | Moessner |
| 4,159,783 A | 7/1979 | Crasnianski |
| 4,235,087 A | 11/1980 | Bianchi |
| 4,294,096 A | 10/1981 | Heimann |
| 4,666,351 A | 5/1987 | Marchal |
| 4,741,652 A | 5/1988 | Marchal |
| 4,752,876 A | 6/1988 | Couch et al. |
| 4,899,391 A | 2/1990 | Cimino et al. |
| 4,901,548 A | 2/1990 | Deslandes |
| 5,167,171 A | 12/1992 | Heredia |
| 5,172,829 A | 12/1992 | Dellicker, Jr. |
| 5,271,698 A * | 12/1993 | Heredia .................. B23C 3/35 409/82 |
| 5,351,409 A | 10/1994 | Heredia |
| 5,383,345 A | 1/1995 | Kallinger-Prskawetz-Jacobsen |
| 5,443,339 A | 8/1995 | Heredia et al. |
| 5,496,138 A | 3/1996 | Drori |
| 5,538,374 A | 7/1996 | Cole et al. |
| 5,538,534 A | 7/1996 | Cole et al. |
| 5,546,316 A | 8/1996 | Buckley et al. |
| 5,556,240 A | 9/1996 | Almblad |
| 5,569,003 A | 10/1996 | Goldman et al. |
| 5,607,267 A | 3/1997 | Heredia et al. |
| 5,660,509 A | 8/1997 | Cole et al. |
| 5,671,523 A | 9/1997 | Juchinewicz |
| 5,676,504 A | 10/1997 | Mueller et al. |
| 5,739,766 A | 4/1998 | Chaloux |
| 5,764,156 A | 6/1998 | Chaloux |
| 5,771,176 A | 6/1998 | Froehlich et al. |
| 5,807,042 A | 9/1998 | Almblad et al. |
| 5,833,406 A | 11/1998 | Chies et al. |
| 5,844,808 A | 12/1998 | Konsmo et al. |
| 5,906,365 A | 5/1999 | Wu |
| 5,908,273 A | 6/1999 | Titus et al. |
| 5,951,218 A | 9/1999 | Wu |
| 5,956,985 A | 9/1999 | Chang |
| 5,964,554 A | 10/1999 | Drori |
| 5,974,844 A | 11/1999 | Harrelson et al. |
| 5,997,224 A | 12/1999 | Beauregard et al. |
| 6,064,747 A | 5/2000 | Wills et al. |
| 6,065,911 A | 5/2000 | Almblad et al. |
| 6,106,131 A | 8/2000 | Hao |
| 6,152,662 A | 11/2000 | Titus et al. |
| 6,185,311 B1 | 2/2001 | Yanovsky et al. |
| 6,237,756 B1 | 5/2001 | Caudle |
| 6,371,286 B1 | 4/2002 | Montanari |
| 6,406,227 B1 | 6/2002 | Titus et al. |
| 6,449,381 B1 | 9/2002 | Yanovsky et al. |
| 6,543,972 B1 | 4/2003 | Cimino |
| D475,195 S | 6/2003 | Christianson |
| 6,588,995 B2 | 7/2003 | Wills et al. |
| 6,595,045 B1 | 7/2003 | Fuglewicz et al. |
| 6,602,030 B1 | 8/2003 | Markbreit |
| 6,641,339 B2 | 11/2003 | Chies et al. |
| 6,647,308 B1 | 11/2003 | Prejean |
| 6,651,470 B1 | 11/2003 | Rafter |
| 6,684,673 B2 | 2/2004 | Florendo |
| 6,782,725 B2 | 8/2004 | Linares |
| 6,801,829 B2 | 10/2004 | Kawai |
| 6,839,449 B1 | 1/2005 | Campbell et al. |
| 6,892,558 B2 | 5/2005 | Chodosh |
| 6,895,100 B1 | 5/2005 | Pacenzia et al. |
| 7,055,352 B2 | 6/2006 | Meyerson et al. |
| 7,077,607 B2 | 7/2006 | Foscan |
| 7,167,892 B2 | 1/2007 | Defosse et al. |
| 7,214,011 B2 | 5/2007 | Ryai, Sr. et al. |
| 7,380,428 B2 | 6/2008 | Morehart et al. |
| 7,387,476 B2 | 6/2008 | Ryai, Sr. |
| 7,527,458 B2 | 5/2009 | Ryai, Sr. et al. |
| D618,983 S | 7/2010 | Downes |
| 7,890,878 B2 | 2/2011 | Bass et al. |
| 7,891,919 B2 | 2/2011 | Bass et al. |
| 7,918,629 B2 | 4/2011 | Belflower et al. |
| 8,074,481 B2 | 12/2011 | Bass et al. |
| 8,126,764 B2 | 2/2012 | Murray et al. |
| 8,128,322 B2 | 3/2012 | Bass et al. |
| 8,142,117 B2 | 3/2012 | Belflower et al. |
| 8,191,779 B2 | 6/2012 | Illingworth et al. |
| 8,214,247 B2 | 7/2012 | Murray et al. |
| 8,215,625 B2 | 7/2012 | Wu |
| 8,225,696 B2 | 7/2012 | Downes |
| 8,287,215 B2 | 10/2012 | Freeman et al. |
| 8,292,556 B2 | 10/2012 | Ryai, Sr. et al. |
| D674,590 S | 1/2013 | Busch |
| 8,342,783 B2 | 1/2013 | Ryai, Sr. |
| 8,373,558 B2 | 2/2013 | Sagady et al. |
| 8,484,068 B2 | 7/2013 | Godwin et al. |
| 8,484,070 B2 | 7/2013 | Murray et al. |
| 8,532,809 B2 | 9/2013 | Freeman |
| 8,600,546 B1 | 12/2013 | Hagen et al. |
| 8,634,951 B2 | 1/2014 | Freeman |
| 8,992,145 B1 | 3/2015 | Mueller et al. |
| 9,073,133 B1 | 7/2015 | Mueller et al. |
| 9,149,877 B1 | 10/2015 | Mueller et al. |
| 9,243,426 B2 | 1/2016 | Gerlings et al. |
| 9,468,982 B1 | 10/2016 | Mueller et al. |
| 9,487,968 B2 | 11/2016 | Gerlings |
| 9,506,272 B2 | 11/2016 | Gerlings et al. |
| 9,556,649 B1 | 1/2017 | Mueller et al. |
| 9,558,236 B1 | 1/2017 | Hagen et al. |
| 9,580,932 B2 | 2/2017 | Gerlings et al. |
| 9,586,272 B1 | 3/2017 | Mueller et al. |
| 9,764,393 B2 | 9/2017 | Mueller et al. |
| 9,797,163 B2 | 10/2017 | Grice et al. |
| 2002/0022901 A1 | 2/2002 | Wetterlin et al. |
| 2002/0031251 A1 | 3/2002 | Campbell et al. |
| 2002/0141843 A1 | 10/2002 | Mueller et al. |
| 2004/0148988 A1 | 8/2004 | Taylor |
| 2004/0253067 A1 | 12/2004 | Bosch |
| 2005/0241353 A1 | 11/2005 | Moening |
| 2006/0044109 A1 | 3/2006 | Griffits et al. |
| 2006/0048553 A1 | 3/2006 | Almquist |
| 2006/0090528 A1 | 5/2006 | Moening |
| 2007/0224008 A1 | 9/2007 | Bass et al. |
| 2008/0145163 A1 | 6/2008 | Freeman et al. |
| 2009/0228795 A1 | 9/2009 | Bass et al. |
| 2010/0052234 A1 | 3/2010 | Ryai, Sr. |
| 2010/0278437 A1 | 11/2010 | Thompson et al. |
| 2010/0278438 A1 | 11/2010 | Thompson et al. |

(56) References Cited

U.S. PATENT DOCUMENTS

| | | |
|---|---|---|
| 2010/0316250 A1 | 12/2010 | Perrigo |
| 2011/0110741 A1 | 5/2011 | Huss et al. |
| 2011/0167377 A1 | 7/2011 | Bass et al. |
| 2011/0176881 A1 | 7/2011 | Bass et al. |
| 2011/0262240 A1 | 10/2011 | Mutch et al. |
| 2011/0297691 A1 | 12/2011 | Freeman |
| 2011/0301738 A1 | 12/2011 | Freeman |
| 2012/0014762 A1 | 1/2012 | Ryai, Sr. et al. |
| 2012/0038453 A1 | 2/2012 | Bass et al. |
| 2012/0154127 A1 | 6/2012 | Donadini |
| 2012/0213603 A1 | 8/2012 | Bass et al. |
| 2012/0243957 A1 | 9/2012 | Drake et al. |
| 2013/0017030 A1 | 1/2013 | Freeman et al. |
| 2013/0039714 A1 | 2/2013 | Ryai, Sr. et al. |
| 2013/0094918 A1 | 4/2013 | Ryai, Sr. |
| 2013/0170693 A1 | 7/2013 | Marsh et al. |
| 2013/0294857 A1 | 11/2013 | Bass et al. |
| 2013/0331976 A1 | 12/2013 | Freeman et al. |
| 2014/0113683 A1 | 4/2014 | Hickey |
| 2014/0377027 A1 | 12/2014 | Burkett et al. |
| 2015/0050094 A1* | 2/2015 | Gerlings ................. E05B 19/04 409/81 |
| 2016/0004892 A1 | 1/2016 | Marsh et al. |
| 2016/0114412 A1 | 4/2016 | Bosch |
| 2016/0321632 A1 | 11/2016 | Moore et al. |
| 2016/0346847 A1 | 12/2016 | Gerlings |
| 2017/0008096 A1 | 1/2017 | Mueller et al. |
| 2017/0100785 A1 | 4/2017 | Hagen et al. |
| 2017/0103516 A1 | 4/2017 | Mueller et al. |
| 2017/0136557 A1 | 5/2017 | Huss et al. |
| 2018/0010364 A1 | 1/2018 | Grice et al. |
| 2018/0071838 A1 | 3/2018 | Gerlings et al. |

FOREIGN PATENT DOCUMENTS

| | | |
|---|---|---|
| DE | 202012100455 U1 | 3/2012 |
| EP | 0362007 A2 | 4/1990 |
| EP | 0709154 | 5/1996 |
| EP | 1338732 | 8/2003 |
| EP | 2000303 | 12/2008 |
| EP | 2517826 | 10/2012 |
| GB | 191403275 A | 6/1914 |
| GB | 2276106 A | 9/1994 |
| WO | WO 89/012867 | 12/1989 |
| WO | WO 93/006959 | 4/1993 |
| WO | WO 02/001480 | 1/2002 |
| WO | WO 02/101180 A2 | 12/2002 |
| WO | WO 2007/093982 | 8/2007 |

OTHER PUBLICATIONS

International Preliminary Report on Patentability dated Feb. 16, 2016 listing PCT/US2014/049740 filed Aug. 5, 2014.
International Search Report dated Nov. 12, 2014 listing PCT/US2014/049901 filed Aug. 6, 2014.
International Preliminary Report on Patentability dated Feb. 16, 2016 listing PCT/US2014/049901 filed Aug. 6, 2014.
International Search Report dated Nov. 12, 2014 listing PCT/US2014/050047 filed Aug. 7, 2014.
International Preliminary Report on Patentability dated Feb. 16, 2016 listing PCT/US2014/050047 filed Aug. 7, 2014.
"Green Curtain Projects Confidential", Dec. 2009.
Office Action in U.S. Appl. No. 15/235,361 dated Feb. 22, 2018; 7 pages.
Office Action in U.S. Appl. No. 15/414,323 dated Mar. 20, 2018; 17 pages.

* cited by examiner

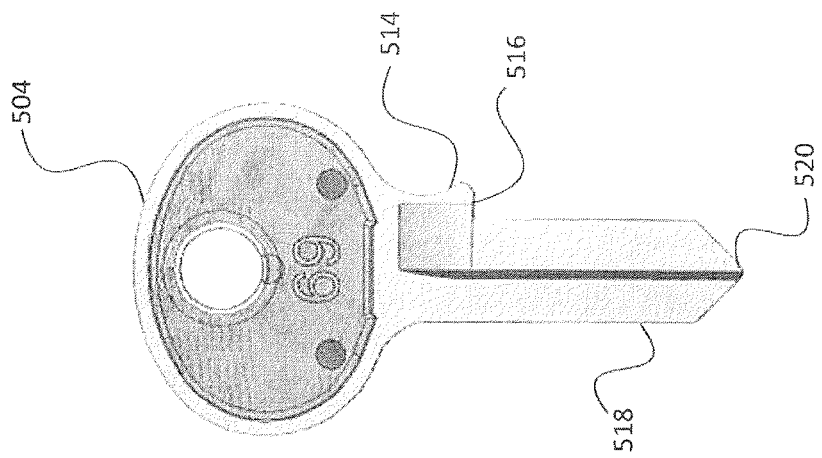
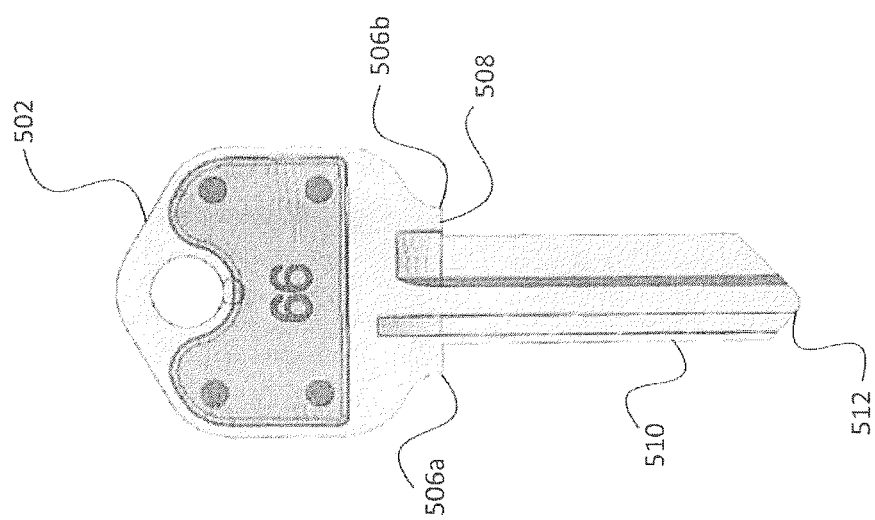
*FIG. 5*

KEY DUPLICATION SYSTEM WITH KEY BLANK ORIENTATION DETECTION FEATURES

CROSS-REFERENCE TO RELATED APPLICATIONS

This application claims priority under 35 U.S.C. § 119 to U.S. Provisional Patent Application No. 62/472,961 filed on Mar. 17, 2017, which is expressly incorporated herein by reference in its entirety.

FIELD

The present disclosure generally relates to key duplication systems, and, more particularly, to a key duplication system capable of detecting whether a user has properly inserted a key blank for cutting.

BACKGROUND

An existing key can be duplicated in any number of different ways, by measuring a profile of the existing key and duplicating that profile within a corresponding key blank. The key blank generally has a size and shape larger than the existing master key, so that the key blank can be machined (e.g., cut and/or milled down) to function like the existing key.

Key duplication systems are used to create copies of existing keys. One type of key duplication system is a self-service vending machine intended for direct use by a customer, without the assistance of a store employee. The vending machine is capable of duplicating a few of the most common and simple types of keys, when the customer inserts an existing key and payment into the machine. No training is required for use of the vending machine. If a customer runs into trouble duplicating the key, it may be difficult to get assistance and the customer may walk away frustrated, or worse yet, with a miscut key that they have paid for but will not work in their lock.

The disclosed system is directed to overcoming one or more of the problems set forth above and/or elsewhere in the prior art.

SUMMARY

The present disclosure is directed to improved key duplication systems. The advantages and purposes of the disclosed systems and methods will be set forth in part in the description which follows, and in part will be apparent from the description, or may be learned by practice of the disclosed embodiments. The advantages and purposes of the disclosed embodiments will be realized and attained by the elements and combinations particularly pointed out in the appended claims.

In accordance with one aspect of the disclosed embodiments, a key blank receiving module for a key duplication system is disclosed. The module comprises a slot configured to receive only a shank of a key blank. The module further comprises two opposing jaws configured to engage the received key blank. The module includes an end stop configured to receive a tip of the shank of the key blank as the tip is inserted through the slot, the end stop being capable of linear displacement via insertion of the key blank. The module also includes one or more sensors configured to detect the linear displacement of the end stop.

In accordance with another aspect of the disclosed embodiments, a key duplication system is disclosed. The system comprises a key blank receiving module, a display for displaying information to a user, and a controller configured to control the key receiving module and the display. The module comprises a slot configured to receive only a shank of a key blank. The module further comprises two opposing jaws configured to engage the received key blank. The module includes an end stop configured to receive a tip of the shank of the key blank as the tip is inserted through the slot, the end stop being capable of linear displacement via insertion of the key blank. The module also includes one or more sensors configured to detect the linear displacement of the end stop.

In accordance with yet another aspect of the disclosed embodiments, a method is disclosed for duplicating a master key. The method includes receiving a key blank into a key blank receiving module through a slot in the outer surface of a key duplication system. The method further includes engaging a tip of the key blank with an end stop of the key blank receiving module. The method includes determining a linear displacement of the end stop as the key blank is received. Additionally, the method comprises comparing the determined linear displacement of the end stop with a known value associated with the received key blank. The method includes providing information to a user. Also, the method includes cutting a bit pattern into at least one side of the received key blank matching that of the master key to be duplicated.

Additional objects and advantages of the disclosed embodiments will be set forth in part in the description which follows, and in part will be apparent from the description, or may be learned by practice of the embodiments. The objects and advantages of the disclosed embodiments will be realized and attained by the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings:

FIG. 5 is a diagram of key types that may be associated with the key making machine of FIG. 2, consistent with disclosed embodiments;

DETAILED DESCRIPTION

Reference will now be made in detail to various embodiments, examples of which are illustrated in the accompanying drawings. Wherever possible, the same reference numbers will be used throughout the drawings to refer to the same or like parts.

Figure 1:
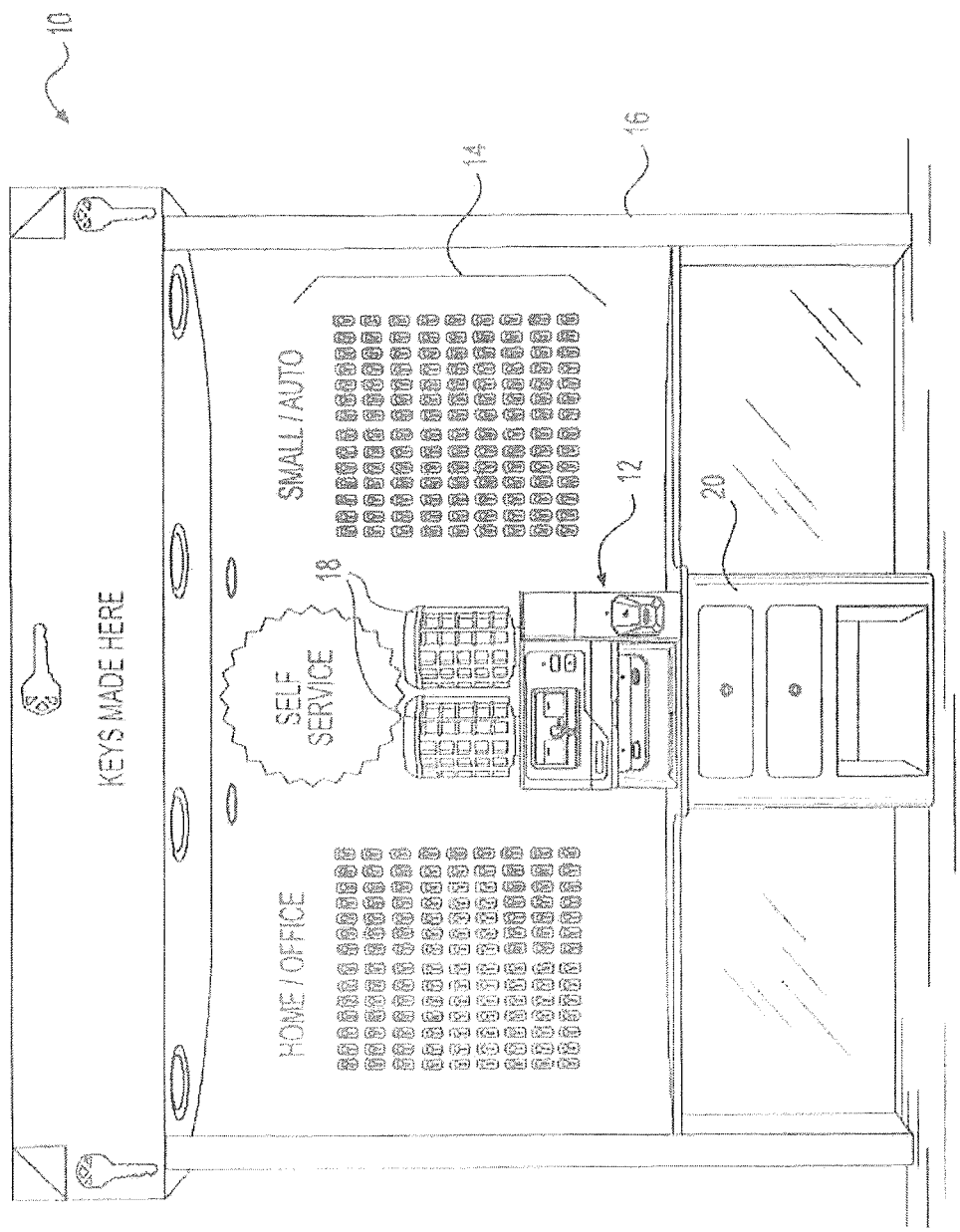
FIG. 1 is an illustration of an exemplary key duplication center, consistent with disclosed embodiments.

FIG. 1 illustrates an exemplary key making center ("center") 10 that can be used to fabricate a copy of an existing key from a corresponding key blank. Center 10 may include, among other things, a key making machine ("machine") 12, and an inventory 14 of key blanks that are stored outside of machine 12. In the disclosed embodiment, inventory 14 includes key blanks arranged by type, size, and/or identification number on a wall 16 behind machine 12, in one or more carousels 18 located on top of machine 12, and/or in a cabinet 20 below machine 12. It is contemplated that the key blanks may be organized and displayed in any manner known in the art. It is important only to note that the key blanks are maintained outside of machine 12 and are manually retrievable for use within machine 12 during a key duplication process.

Figure 2:
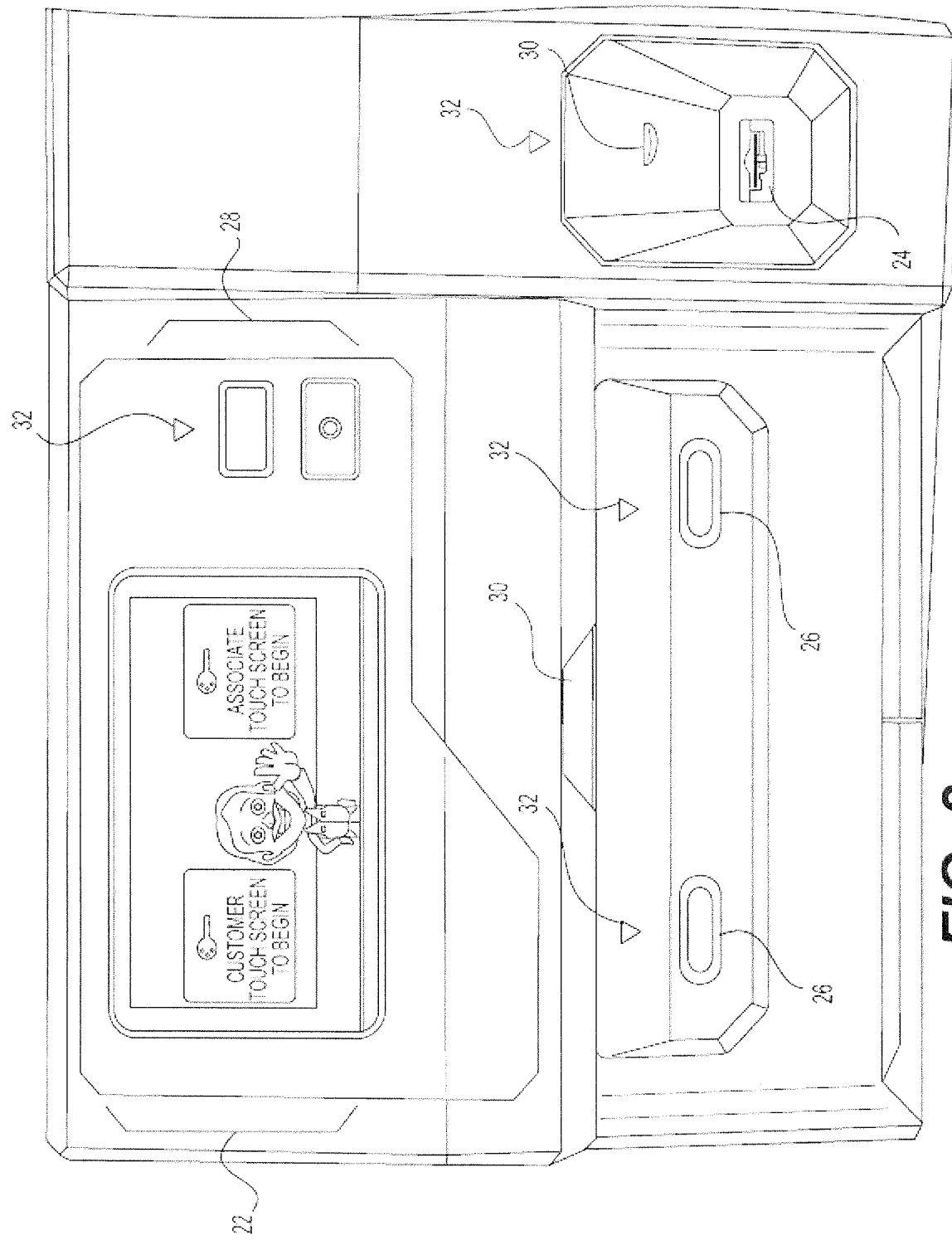
FIG. 2 is an illustration of an exemplary key duplication machine that forms a portion of the center of FIG. 1, consistent with disclosed embodiments.

As shown in FIG. 2, machine 12 may be designed for human interaction during the key duplication process. In particular, machine 12 may have a centralized display 22, an existing key slot ("slot") 24, one or more key blank slots ("slots") 26, a transponder section 28, and a reader 30. Following cues provided via display 22, a user may insert an existing key into slot 24 for identification and/or data capturing, and then insert a corresponding key blank manually retrieved from inventory 14 into slot 26 for fabrication. Transponder section 28 may be used to detect and/or program transponders embedded within the existing key and/or the key blank. Reader 30 may be used to confirm that a manually retrieved key blank is the correct key blank corresponding to the existing key, and/or to charge the user for the key duplication process. One or more of slot 24, slot(s) 26, transponder section 28, and reader 30 may be provided with an indicator light 32 in close proximity that provides additional cues to the user of machine 12.

Figure 3:
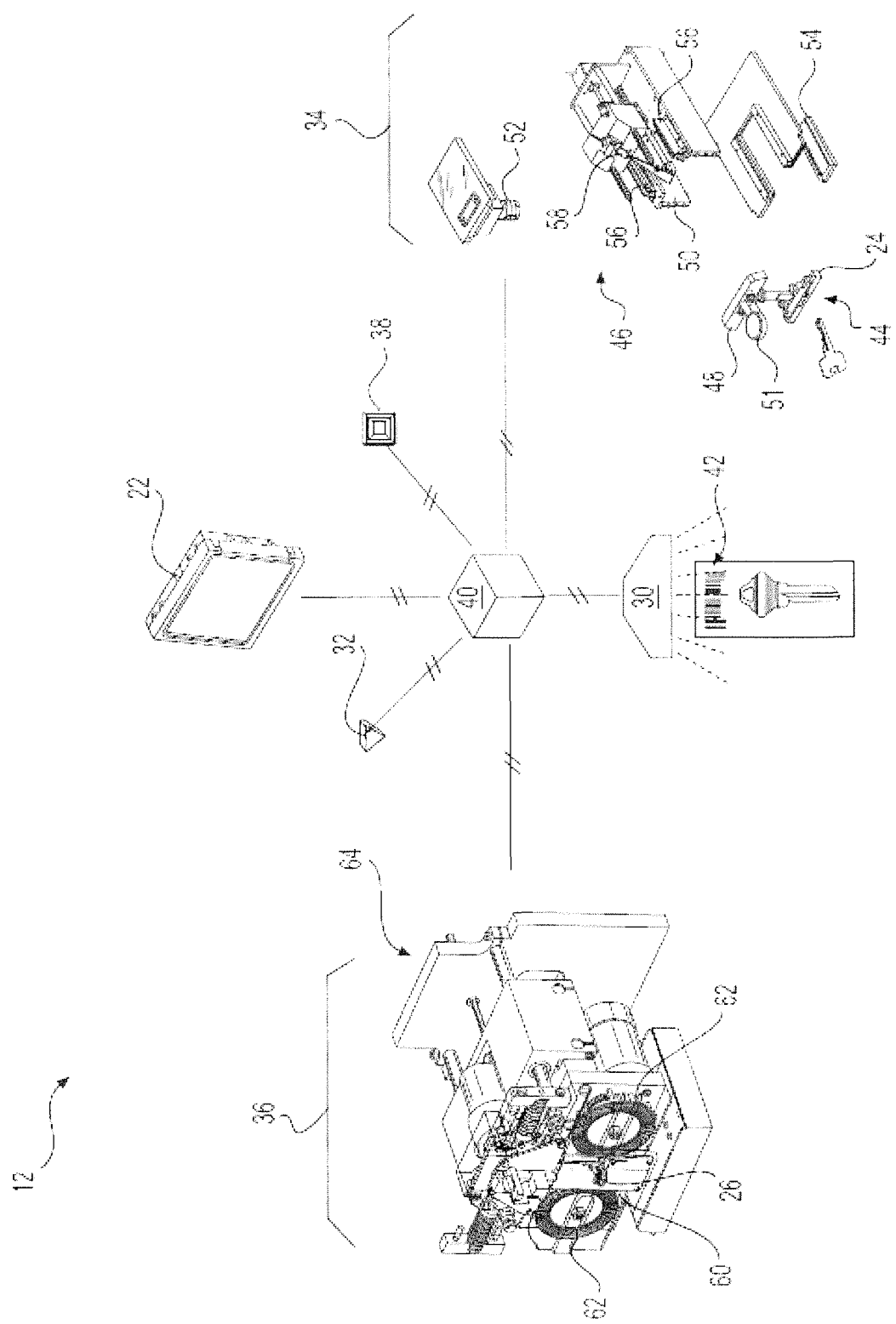
FIG. 3 is a control diagram of the key making machine of FIG. 2, consistent with disclosed embodiments.

A diagrammatic illustration of machine 12 is provided in FIG. 3. As shown in this figure, machine 12 may be generally modular and include, among other things, an identification module 34 configured to receive the shank end of an existing key inserted through slot 24, at least one fabrication module 36 configured to receive the shank end of a key blank inserted through slot 26, a transponder sensor/cloner 38 associated with transponder section 28, and a controller 40. Controller 40 may communicate with each of the other components, as well as with display 22, reader 30, and indicator light(s) 32 to regulate the key duplication process. Although the inter-component communications shown in FIG. 3 are illustrated as wired connections, it is contemplated that some or all of these communications could be wireless (e.g., Bluetooth, cellular, infrared, radio, Wi-Fi, etc.), if desired. It is further contemplated that machine 12 could be equipped with a router or cellular modem for communication with another machine 12, a back office, a service tool, etc. Further, it is contemplated that the modules and components of machine 12 may be configured in any arrangement or relationship. For example, controller 40, display 22, reader 30, and/or indicator light(s) 32 may all be integrated into a single piece of hardware, or may be separated as illustrated in FIG. 3.

As described above, display 22 may provide cues to the user of machine 12 regarding the key duplication process. These cues may include, among other things, when, where, and how to insert the existing key and the key blank into machine 12. For example, display 22 may have a graphical user interface (GUI) that shows an image of the outside of machine 12, along with highlighting of the active slot (i.e., slot 24 or slot 26) that should be used for key insertion. In another example, controller 40 may correlate images on display 22 with illumination of particular indicator lights 32, thereby guiding the user to the correct slot. Further, a color, intensity, and/or frequency of light illumination may vary based on a degree of key insertion. For example, a particular indicator light 32 could initially illuminate in a red color, attracting the attention of the user to the corresponding slot. Then, as the user inserts the existing key or the key blank into that slot, the particular indicator light 32 could illuminate in a yellow color, followed by green when the key is fully and properly inserted. Other illumination strategies may also be employed.

In some embodiments, display 22 may additionally allow the user to input instructions, make selections, and/or answer questions regarding a desired duplication event. The instructions may include, for example, a number of duplicate keys to be produced, a desired pick-up time, a user's name, a desired delivery address, key identification information, a desire for duplication information to be stored for future reference, etc. The questions asked of the user may include for example, a make, model, and/or year of an associated car that the existing key corresponds with; a type and/or brand of lock to which the existing key belongs; and whether the existing key is a transponder key. The instructions, selections, and/or questions, as well as corresponding responses, may be communicated visually, audibly, and/or tactilely via display 22, as desired. For example, display 22 may be a touch screen and/or include another input device such as a key board, a mouse, a light pen, or a microphone that receives input from the user. Information received via display 22 may be directed to controller 40 for further processing, and controller 40 may respond to the customer via display 22.

Reader 30 may be configured to detect and read an index 42 associated with the key blanks of inventory 14. In one example, each index 42 is a unique barcode printed on a card to which each key blank is affixed, and corresponds with information stored in a memory of controller 40. For example, the barcode could correspond with an identity of the affixed key blank and/or a cost associated with using the affixed key blank in a duplication process. It is contemplated that the barcode (or another index 42) could alternatively be located directly on the key blank, if desired. Signals generated by reader 30 may be directed to controller 40 for comparison of the stored identity with an expected identity of a correct key blank. If the identity associated with index 42 does not correspond with the expected identity of the correct key blank, controller 40 may then cause display 22 to alert the user that the selected key blank is incorrect.

Identification module 34 may be configured to detect, identify, and/or measure distinguishing characteristics of the existing key inserted through slot 24. Although identification module 34 is shown in FIG. 2 as being co-located within a common housing, it is contemplated that identification module 34 could alternatively be housed separately and positioned near (e.g., adjacent and facing in the same or another direction as) or remote from fabrication module 36, as desired. Identification module 34 may include, among other things, a key receiving assembly 44 and an imaging system 46. Key receiving assembly 44 may be configured to receive an existing key in a particular orientation (e.g., lying horizontally with the shank thereof pointed inward toward the module) and at a particular location. Imaging system 46 may be configured to generate images of the existing key (or portions thereof) after it is received within key receiving assembly 44, and to direct data associated with the images to controller 40.

An exemplary embodiment of key receiving assembly 44 is shown in FIG. 3 as having a clamp 48 located immediately adjacent slot 24, and a guide 50 positioned at a side of clamp 48 opposite slot 24. Each of these components may cooperate to receive an existing key as the existing key is inserted by the user shank-first through slot 24. For example, side edges of slot 24 may be beveled inward toward a general center such that, as the existing key is inserted, the head of the existing key may engage the bevels and be urged toward the center (i.e., toward greater alignment with guide 50). Guide 50 may slide from clamp 48 inward to a desired imaging position during and/or after insertion of the existing key through slot 24. Clamp 48 may be spring-biased to secure the existing key in place during imaging, and a mechanical advantage may be provided to help reduce the effort required from the operator to insert the existing key through slot 24. In the disclosed embodiment, the mechanical advantage is provided by way of a lever arm 51.

Imaging system 46 may be a vision-based system employing one or more sources of visible and/or invisible light, and a receiver. The receiver may be, for example, a camera 52 that is located to any side of the existing key during imaging. Camera 52 may be configured to capture images of the existing key, while the light sources are selectively turned on and off. In the disclosed example, the light sources are "back lights" 54 configured to shine directly or indirectly toward the existing key from a side opposite (e.g., from below) camera 52. Camera 52, at this time, may capture a silhouette image of the existing key showing an exterior edge outline of the existing key and a location of reference features of the existing key (e.g., of shoulders and/or a tip of the existing key). Signals generated by camera 52 may be directed to controller 40 for further processing.

In another example, imaging system 46 may include one or more "side lights" 56 and/or a laser 58. Side lights 56 may be configured to shine light onto the existing key, one at a time, from an oblique side angle. During activation of each side light 56, camera 52 may be used to generate an image of the existing key showing an interior edge outline of notches milled into a center of the existing key. Laser 58 may be configured to scan the existing key while camera 52 generates one or more transverse stripe images. These additional signals generated by camera 52 may also be directed to controller 40 for further processing.

Fabrication module 36 may include, among other things, a receiving unit or module 60, and one or more cutting wheels 62 movable relative to receiving unit 60 via a gantry 64. The key blank retrieved by the user from inventory 14 based on image data captured via identification module 34 may be inserted through slot 26 into receiving unit 60. After being accepted by receiving unit 60 (e.g., after the shank end of the key blank has passed through slot 26), cutting wheel(s) 62 and gantry 64 may be selectively activated to produce desired features within the key blank.

Receiving unit 60 may have any configuration known in the art for receiving, clamping, and/or positioning the inserted key blank relative to cutting wheels 62. Receiving unit 60 will be described in further detail below in association with FIGS. 6-9.

Cutting wheels 62 may be used to make notches in one or both shank edges of the key blank. During fabrication of the notches, one or more motors connected to cutting wheels 62 may be selectively activated, and a lead screw of gantry 64 may be driven in an X-direction to move cutting wheels 62 into and out of the shank along the length or Y-direction of the key blank. The amount of movement in the X-direction at a given position in the Y-direction may be controlled based on the pattern of existing notches measured in the existing key by identification module 34. For a single-edged key, only one of cutting wheels 62 may be used at one side of the key blank. For a dual-edged key, both cutting wheels 62 may be used at the same time or at different times to create notches in opposing sides of the key blank. It is contemplated that some fabrications modules 36 may have only one cutting wheel 62, while other fabrication modules 36 may include the two cutting wheels 62 described above. In particular, some systems may be designed to cut only a single edge into a key blank, while other systems may be designed to cut dual edges. In fact, it may be possible for a single fabrication module 36 to include both types of systems. Any configuration may be possible.

As discussed above, it may be possible for the existing key that the user wishes to duplicate to be embedded with or otherwise include a transponder that enables activation of an associated lock (e.g., an ignition lock in a vehicle). In these situations, it may be desirable to code a new duplicate key (i.e., the key blank notched by machine 12) to match the existing key with the same transponder code to ensure that the duplicate key functions in the same manner as the existing key. In the disclosed embodiment, the transponder code in the existing key can be detected and read at sensor/cloner 38. And after fabricating notches into the shank of the appropriate key blank, the same code may be cloned within the transponder of the new key at sensor/cloner 38. In the disclosed embodiment, sensing and cloning are performed by the same device and at the same location on machine 12. It is contemplated, however, that different devices located together or separately may alternatively be used to perform these functions, if desired. It is also contemplated that cloning and notch fabrication may occur in any order; in some embodiments, the transponder code may be cloned before fabricating notches into the shank of the key blank.

Controller 40 may embody a single microprocessor or multiple microprocessors that include a means for controlling operations of machine 12. Numerous commercially available microprocessors can be configured to perform the functions of controller 40. Controller 40 may include all the components required to run an application such as, for example, a memory, a secondary storage device, and a processor, such as a central processing unit or any other means known in the art for controlling display 22, reader 30, indicator lights 32, identification module 34, fabrication module 36, and transponder sensor/cloner 38. Various other known circuits may be associated with controller 40, including power supply circuitry, signal-conditioning circuitry, solenoid driver circuitry, communication circuitry, switching circuitry, and other appropriate circuitry.

In some embodiments, machine 12 may also include a means for receiving payment from the user. These means may include, for example, a coin operated mechanism, a bill receiver, a credit card reader, and/or a receipt reader (e.g., a barcode reader configured to recognize a previous payment having already been received at another location and/or time). The means for receiving payment may be located anywhere on machine 12, and be capable of directing signals associated with the payment to controller 40 (or elsewhere) for further processing.

Figure 4:
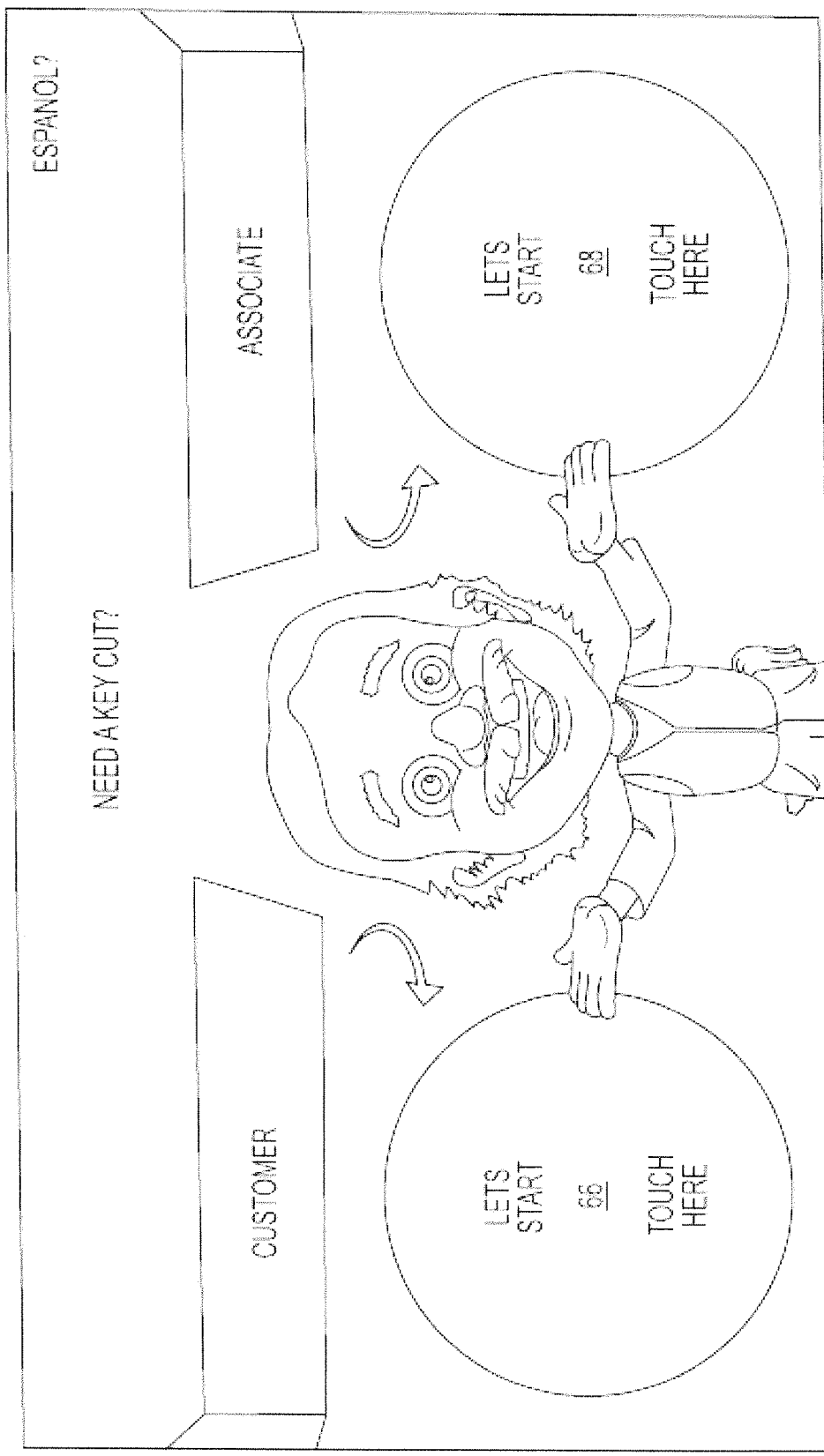
FIG. 4 is an exemplary disclosed graphical user interface associated with the key duplication machine of FIG. 2, consistent with disclosed embodiments.

FIG. 4 illustrates an exemplary graphical user interface that may be shown on display 22 during a duplication process that is implemented by controller 40.

To begin the duplication process, a user (e.g., the customer or the sales employee) may approach machine 12 and be greeted by a message on display 22. FIG. 4 represents one such message that may be shown on display 22 at this time. As seen in FIG. 4, the greeting message shown on display 22 may ask the user to indicate if the user is a customer or an employee, and provide a way for the user to respond. Specifically, the user may touch one of two designated areas (e.g., a customer area 66 or an employee area 68) of display 22 corresponding to the correct answer.

The disclosed key making machine 12 may allow for the making of a greater variety of keys by a broader spectrum of users. Specifically, customers may utilize machine 12 to make non-transponder types of keys having any configuration available in inventory 14. In addition, sales employees may utilize machine 12 to make the same keys available to a customer, as well as transponder keys. This may reduce a floor space consumed by machine 12 within the retail environment, and help to boost profitability and customer satisfaction. In addition, because the variety of keys that machine 12 may duplicate is not limited to a number of key blanks that can be stored inside of machine 12, the use of machine 12 may be expanded.

FIG. 5 is a diagram of exemplary key blanks that may be associated with the key making machine of FIG. 2, consistent with disclosed embodiments. In FIG. 5, key blanks 502 and 504 are depicted, representing two types of key blanks that may be cut within machine 12. Key blank 502 represents a key blank commonly associated with house keys in the United States, a "#66" key. Key blank 504 represents a key blank commonly associated with padlock keys in the United States, a "#69" key. Although these specific blanks are depicted in FIG. 5, it is to be understood that they are only representative examples. One of skill in the art would understand that key blanks designed for any purpose with the common features of key blanks 502 and 504 could be used in association with machine 12.

Key blank 502 and 504 differ in several ways that impact the way that machine 12 may identify, align, and cut them. One area of difference pertains to the so-called "shoulders" of the key blank, which are important for aligning and securing the key within the key duplication system. As shown in FIG. 5, key blank 502 has two identical shoulders 506a and 506b, while key blank 504 has only a single flared shoulder 514. Another difference between the key blank types is the nature of the key tip. As can be seen in FIG. 5, tip 512 of key blank 502 is offset, while tip 520 of key blank 504 is centered and symmetrical. This is another variation among key blanks that must be accounted for and addressed within machine 12 in order to faithfully duplicate the bitting pattern of a master key into one or more key blanks.

The shoulders, tips, and blades of key blanks contain physical features that provide important information to machine 12 when inserted via slot 26. In some embodiments, these features may serve as locating surfaces that permit display 22, reader 30, indicator lights 32, identification module 34, fabrication module 36, transponder sensor/cloner 38, and/or other components to detect the status of key blank insertion, whether the key blank is properly aligned, etc. They also can help to distinguish and identify key blanks among each other. When inserted into fabrication module 36 of machine 12 via slot 26, the thin, flat anterior surfaces of the key shoulders (which are as wide as the key is thick) serve as locating surfaces in the y-direction of the side of the key to be cut. In FIG. 5, key blank 502 has locating surface 508 (associated with shoulder 506b) on the bit-cutting side of the blade of the key blank. Key blank 504 has locating surface 516 associated with its single shoulder 514.

When only one side of a key blank is to be cut by a fabrication module 36, the other side, or spine, of the key also serves as an additional locating surface for machine 12 in the x-direction. For key blank 502, spine 510 serves as that surface, while for key blank 504, spine 518 serves a similar function. In some embodiments, both sides of a key may be cut, and fabrication module 36 may not utilize the spines of key blanks in those embodiments as additional locating surfaces.

Figure 6:
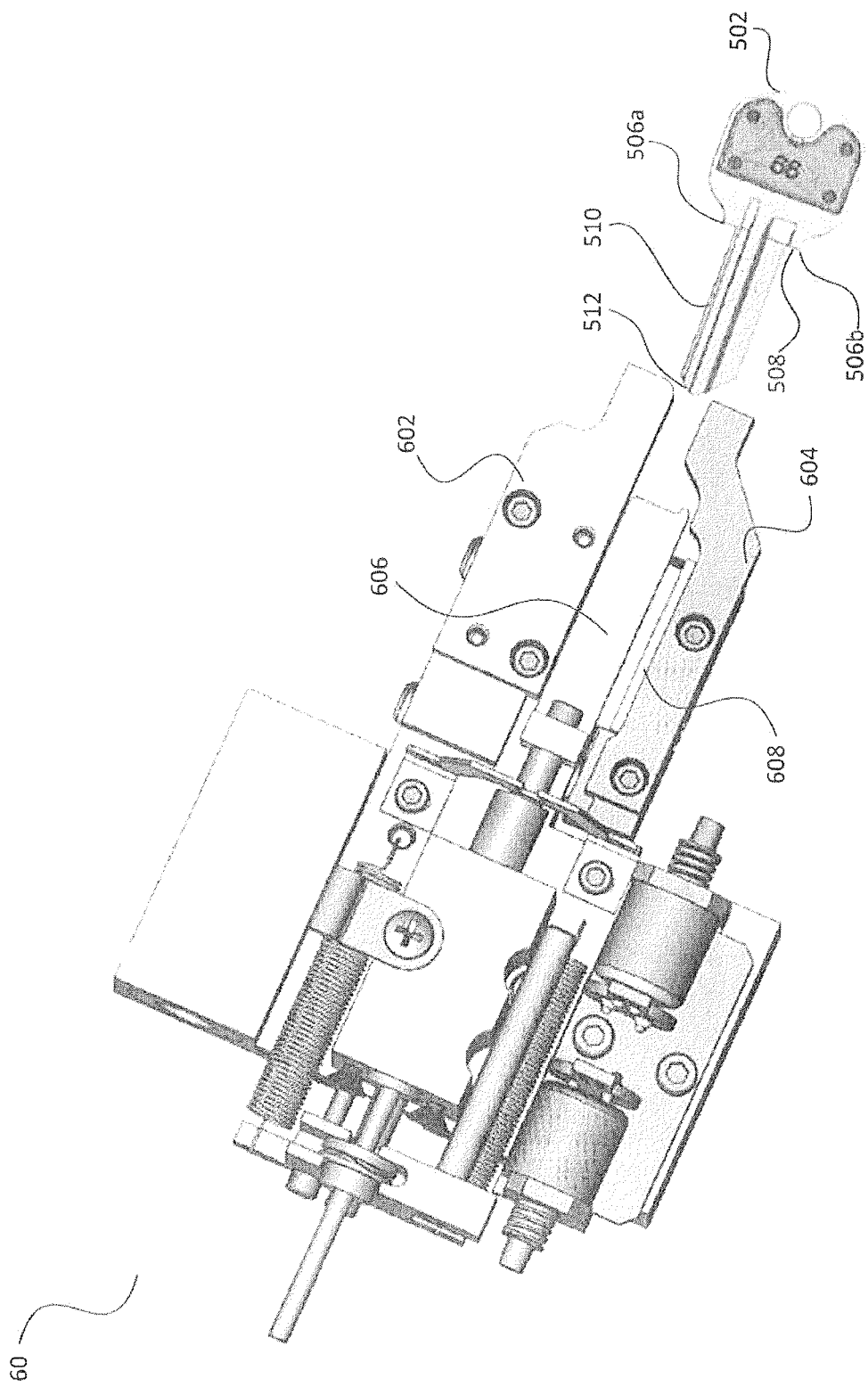
FIG. 6 is a diagram of a key receiving and aligning assembly, consistent with disclosed embodiments.

FIG. 6 illustrates an example receiving unit 60, consistent with disclosed embodiments. When either a customer (having pressed customer area 66 on display 22 as described above) or a store associate at the location of machine 12 (having pressed employee area 68 on display 22) inserts a key blank through slot 26 of machine 12, the key blank is received shank-first into receiving unit 60. Although key blank 502 is illustrated in FIG. 6, any key blank compatible with machine 12 may be inserted. As discussed above, in some embodiments features such as reader 30 may analyze key blank 502 as it is inserted and confirm that it is the desired type of key blank corresponding to the master key inserted into slot 24.

Receiving unit 60 may have any configuration known in the art for receiving, clamping, and/or positioning a desired key blank (such as key blank 502) relative to cutting wheels 62 (not shown in FIG. 6). In one embodiment shown in FIG. 6, receiving unit 60 includes opposing jaws 602 and 604 to sandwich the shank of a key blank, which are the same length. In these embodiments, jaw 602 may be fixed, while jaw 604 may be movable. Jaws 602 and 604 may themselves have positioning features that may mechanically push the shank of key blank 502 into an aligned position within fabrication module 36.

Receiving unit 60 may also include an end stop 606 configured to engage the tip 512 of key blank 502. In the embodiment illustrated in FIG. 6, end stop 606 is the plunger tip of a potentiometer, and is movable as key blank 502 is inserted. In this way, a length of the key blank 502 may be measured as the blank is inserted, and the length may subsequently be used as a way to confirm identity and/or proper placement of the key blank. In other embodiments, end stop 606 may not be associated directly with a potentiometer or other sensor, and may instead be a tip guide attached to other components of receiving unit 60. For example, in some embodiments, a potentiometer may be omitted, if desired, and fabrication system 36 may be configured to only cut key blanks having a known length. In these embodiments, measurement of the shank of the key blank may not be necessary.

The end stop 606 may act in concert with a shield 608. Shield 608 may include geometry and mechanical implements configured to engage other components of receiving unit 60, including but not limited to end stop 606 and jaws 602 and 604. Shield 608 may, in some embodiments, maintain these other components of receiving unit 60 into a proper location and/or orientation relative to other components of fabrication module 36. In these embodiments, key guide 608 may include shelves, protrusions, or other implements configured to engage other components of receiving unit 60.

In some embodiments, other components of machine 12 may be configured to assist with alignment and/or identity confirmation of a key blank inserted through slot 26. For example, display 22, reader 30 and indicator light(s) 32 may be configured to enhance placement of a key blank (such as key blank 502 or 504) within receiving unit 60. Specifically, in some embodiments key blank 502/504 may be configured with one or more scannable or readable features located on the key blank itself or on associated packaging. Reader 30 may be configured to scan for such features and compare the readout (or lack thereof) to known values for the desired key blank based on the detected master key inserted in slot 24. If no readout is detected, controller 40 may indicate to the user via display 22 and/or indicator light(s) 32 that there is a problem with the insertion of the key blank.

As a key blank (such as key blank 502) is inserted into receiving unit 60 via slot 26, the tip portion 512 of the shank of the key blank may engage the end stop 606, displacing the end stop 606 away from slot 26. This insertion motion may continue until other portions of key blank 502, such as shoulders 506a/506b, contact other components of receiving unit 60. In the embodiment illustrated in FIG. 6, spine 510 of key blank 502 may first engage a surface of fixed jaw 602 while tip 512 is engaged with end stop 606. Fixed jaw 602 may thus guide key blank 502 in the proper insertion direction. Next, locating surface 508 of shoulder 506b may engage a surface of movable jaw 604. As the user continues to insert key blank 502 into slot 26, movable jaw 604 may gradually displace and allow further insertion.

Insertion of the key blank 502 through slot 26 as shown in FIG. 6 and engagement with the various components of receiving unit 60 may be used to activate various other modules and components of machine 12, such as fabrication module 36 or identification module 34. Various sensors may be associated with components of receiving unit 60 and may send and receive information to and from controller 40 for purposes of activating and controlling these various other modules and components of machine 12. In some embodiments, the sensor(s) may be associated with end stop 606, such as an associated potentiometer. In other embodiments, the sensor(s) may be associated with shield 608, or with jaws 602 and/or 604. Any known sensing device or combination(s) thereof may be used for this purpose and may include, but not be limited to, an accelerometer, a hall effect sensor, an optical sensor, a mechanical switch, a linear variable differential transformer (LVDT), etc. Sensors may be employed to monitor a start of insertion of key blank 502, an end of insertion of key blank 502, and/or a stability of key blank 502 after insertion, and information and data gathered through this monitoring may be selectively used to help control the identification process. For example, upon initial insertion of key blank 502, data from the sensor(s) may be used to activate display 22, reader 30, or indicator light(s) 32 via controller 40. In other embodiments, upon termination of the insertion of key blank 502, data from the sensor(s) may be used to activate display 22, reader 30, or indicator light(s) 32 via controller 40. Irregular activity during insertion, such as irregular movement, misalignment, lack of input, etc. could also trigger the sensor(s) and be used to activate display 22, reader 30, or indicator light(s) 32 via controller 40 to communicate with the user to correct the irregular activity.

As discussed above, in the embodiment of receiving unit 60 depicted in FIG. 6, jaws 602 and 604 are the same length. Additionally, the front face of end stop 606 is flat. A drawback of this configuration is that key blank 502 (or any other compatible key blank) would contact these mechanical components in the same fashion regardless of the orientation of the key blank. In other words, whether the key blank is correctly inserted or inserted upside down, end stop 606 would be displaced by tip 512, and a shoulder 506a/b would contact movable jaw 604. Receiving unit 60 would therefore potentially be incapable of detecting whether the key blank was inserted upside down without additional costly additions to the assembly. These additions could include, but not be limited to, additional cameras, sensors, lasers, or other such detection devices. Addition of these components would undesirably raise the cost and complexity of center 10 and/or machine 12, and would reduce its industrial applicability. On the other hand, the inability of receiving unit 60 to detect whether a key blank is correctly oriented upon insertion is also undesirable. Since machine 12 is particularly designed to be operated by an untrained user from the general public, allowing key blanks such as key blank 502 to be inserted upside down (i.e. such that the spine 510 would be cut by fabrication module 36) creates an unacceptable risk of miscuts and/or damage to system components. Either scenario would engender user distrust and dissatisfaction, as well as increased system downtime and maintenance costs.

Figure 7A:
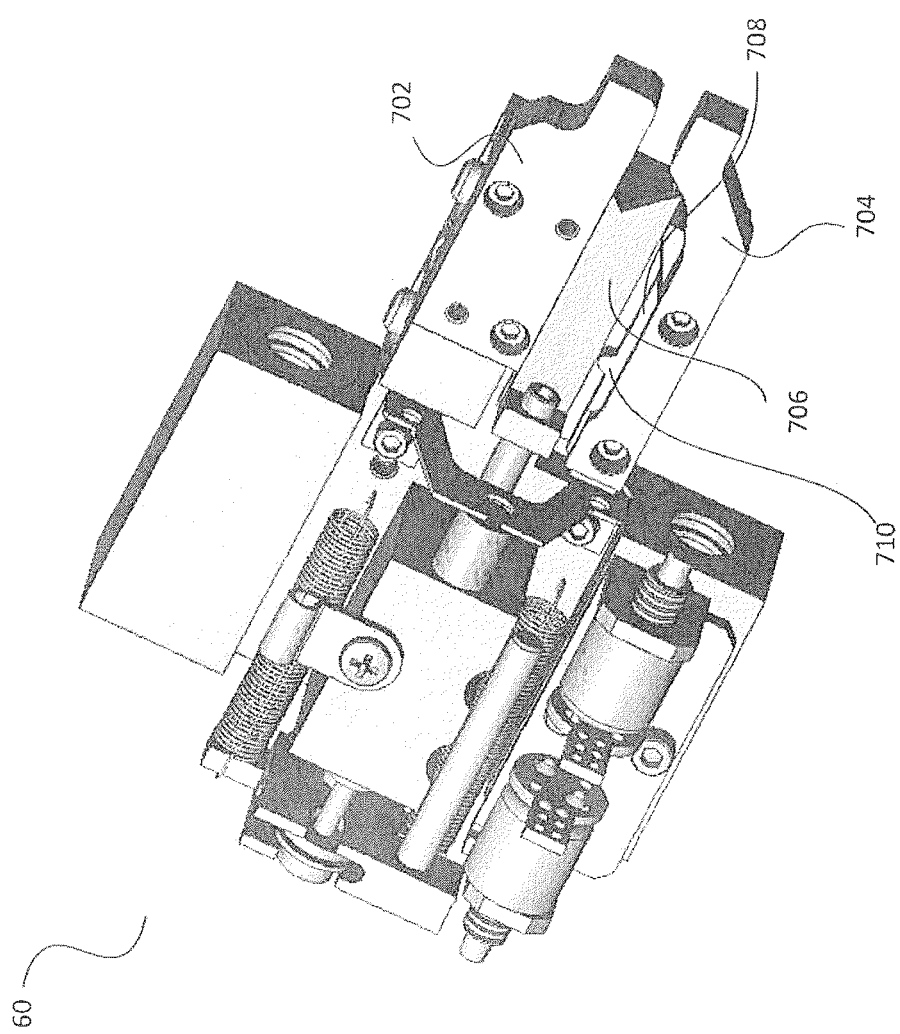
FIGS. 7A-7B are diagrams of a key receiving and aligning assembly, consistent with disclosed embodiments.
Figure 7B:
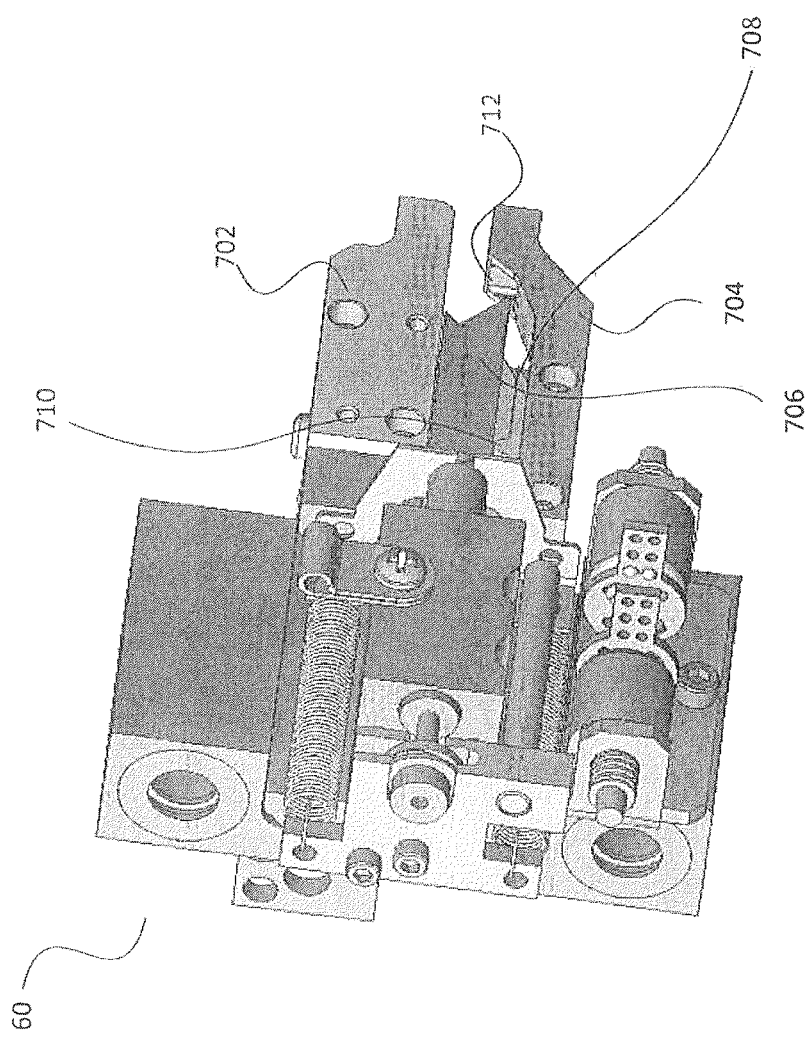

Disclosed embodiments herein are directed to overcoming these design issues, to further enhance the user experience and reduce potential errors by enabling detection of key blanks inserted in an improper orientation. One such embodiment is illustrated in FIGS. 7A-7B. In FIG. 7A, the general configuration of receiving unit 60 is similar to that of FIG. 6, but several alterations are made in order to detect key blanks inserted upside down.

Opposing jaws 702 and 704 illustrated in FIG. 7A may be similar to jaws 602 and 604, but with several differences. In these embodiments, jaw 702 may be fixed, while jaw 704 may be movable. As was the case with jaws 602 and 604, jaws 702 and 704 may themselves have positioning features that may mechanically push the shank of an inserted key blank into an aligned position within fabrication module 36. Unlike jaws 602 and 604, however, jaws 702 and 704 may not be the same length. In some embodiments, fixed jaw 702 may be shorter than movable jaw 704. Fixed jaw 702 may vary in length from movable jaw 704 within a range useful for detecting that a key blank, such as key blank 502, has been inserted in an improper orientation. In some embodiments, fixed jaw 702 may be between about 0.050" and about 0.1" (1.27-2.54 mm) shorter than movable jaw 704. In some embodiments, fixed jaw 702 may be about 0.06" (1.524 mm) shorter than movable jaw 704. In alternative embodiments, movable jaw 704 may be shorter than fixed jaw 702.

Receiving unit 60 as shown in the illustrated embodiment of FIG. 7A may also include an end stop 706 configured to engage the tip of an inserted key blank. End stop 706 illustrated in FIG. 7A may be similar to end stop 606, but with several differences. As was the case with end stop 606, end stop 706 may be configured to be the plunger tip of a potentiometer, and is displaceable as a key blank is inserted. In this way, a length of the inserted key blank may be measured as the blank is inserted, and the length may subsequently be used as a way to confirm identity and/or proper placement of the key blank. In other embodiments, end stop 706 may not be associated directly with a potentiometer or other sensor, and may instead be a tip guide attached to other components of receiving unit 60. For example, in some embodiments, a potentiometer may be omitted, if desired, and fabrication system 36 may be configured to only cut key blanks having a known length. In these embodiments, measurement of the shank of the key blank may not be necessary.

Unlike end stop 606, however, end stop 706 may not have a flat front face, as shown in FIG. 7A. Rather, end stop 706 may be configured to have a front face that is contoured, such that it may be better able to engage tip 512 of key blank 502 (or tip 520 of key blank 504). As shown in FIG. 7A, end stop 706 may include a recess configured to receive the tip of an inserted key blank when the shank of said blank is inserted through slot 26. Although shown as being generally curved and shaped like the tip of a key blank (e.g. with a radius and/or depth that generally inhibits skewing of the key blank shank), it is contemplated that the depicted recess in end stop 706 could be configured as another shape (e.g., a cone, square, rectangular shape, continuous linear slope, or others) if desired or if necessary to accommodate different types of key blanks. In other embodiments, the recess may be configured to be shaped in a fashion that it could accommodate a variety of different shapes, if desired.

As was the case with end stop 606, end stop 706 may act in concert with a shield 708. Like shield 608, shield 708 may include geometry configured to engage other components of receiving unit 60 and into a proper location and/or orientation relative to other components of receiving unit 60 or to fabrication module 36. Shield 708 may contain additional mechanical features or implements for these purposes, such as protrusion 710. Other such mechanical features and implements may include, but not be limited to, the larger side guide visible in FIG. 7A posterior to the recess of end stop 706. These features may protect elements of receiving unit 60 in the event of excess motion, such as a user wiggling, jamming, or twisting a key blank. In these embodiments, for example, protrusion 710 may prevent end stop 706 from motion in the Y-direction, and may prevent contact with movable jaw 704. The larger side guide of shield 708 may prevent motion in the X-direction.

FIG. 7B is a rotated view of FIG. 7A. As illustrated in FIG. 7B, movable jaw 704 may also be configured to have relief clearance for insertion of a key blank, such as cavity 712. In these embodiments, one or both of end stop 706 and/or shield 708 may be longer than end stop 608 and/or shield 608, respectively. Lengthening of these components may permit receiving unit 60 to receive and detect shorter key blanks (such as key blank 504 or shorter) while having an end stop 706 with a non-flat face. Cavity 712 may permit free motion and operation of these lengthened components without contact or interference with movable jaw 704.

Figure 8A:
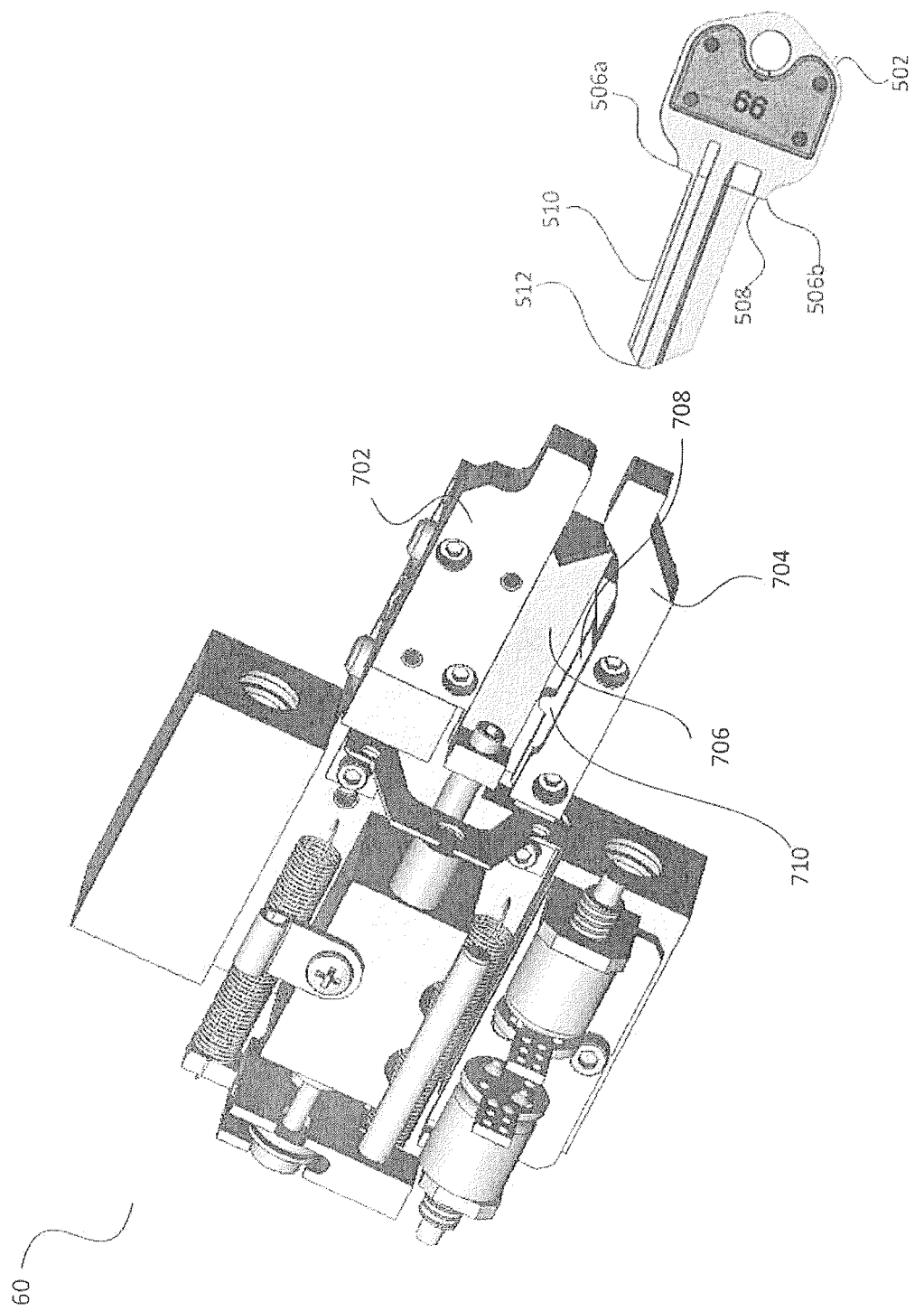
FIGS. 8A-8B are diagrams of a key receiving and aligning assembly, consistent with disclosed embodiments.

FIG. 8A depicts the same receiving unit 60 as illustrated in FIGS. 7A-7B, this time with a key blank 502 present. With the configuration of receiving unit 60 depicted in FIG. 8A, detection of proper orientation of key blank 502 may proceed as follows. If a key blank with an offset tip 512, like key blank 502, is properly inserted into receiving unit 60 through slot 26 (i.e., with spine 510 engaged with fixed jaw 702 and the other side of the shank (to be cut) engaged with movable jaw 704), then tip 512 will interface completely with the recess in end stop 706. Receiving unit 60 will then permit insertion of key blank 502 until locating surface 508 on shoulder 506(b) contacts the face of movable jaw 704. In the embodiment illustrated in FIG. 8A, where end stop 706 is the plunger of a potentiometer, the plunger would be displaced linearly by a known amount and the proper length of the shank of key blank 502 would be registered by the potentiometer associated with receiving unit 60.

If, however, key blank 502 (with an offset tip 512) is inserted upside down into slot 26 by the user of machine 12 (i.e., with spine 510 engaged with movable jaw 704 instead of fixed jaw 702, and the other side of the shank (to be cut) engaged with fixed jaw 702 instead of movable jaw 704), then tip 512 will interface incompletely with the tip-shaped recess in end stop 706 while protrusion 710 maintains the side load position of end stop 706 and allows smooth insertion. Consequently, a different part of the end stop 706 will be contacted by tip 512, and end stop 706 will not displace linearly as far into receiving unit 60 as would be expected if the key blank 502 were inserted right side up and tip 512 were to fit in the recess perfectly. Moreover, locating surface 508 will fail to contact movable jaw 704 as intended. Instead, the anterior surface of shoulder 506a will contact movable jaw 704, while locating surface 508 will also fail to contact shortened fixed jaw 702. In some embodiments, machine 12 and receiving unit 60 may be configured, via controller 40, to detect (via sensors, electromagnetic signals, or other means) that locating surface 508 is not in proper contact with movable jaw 704, and may transmit an audible or visual indication to the user through display 22 and/or indicator light(s) 32. Similarly, machine 12 and receiving unit 60 may be configured, via controller 40, to detect (via sensors, electromagnetic signals, or other means) that spine 510 is not in proper contact with fixed jaw 702, and may transmit a similar audible or visual indication to the user.

Insertion of key blank 502 in an improper (e.g. upside down) orientation, with the resulting imperfect fit of tip 512 into the recess of end stop 706, will result in an associated measurement of a length of the key blade by an associated potentiometer (or other such sensor) that will be different enough from the expected value to be significant and detectable. The difference in detected length may range from 0.06" to 0.15" (1.524-3.81 mm), which is within the detectable range of potentiometers known in the art. Upon detecting a different-than-expected length using the potentiometer or other sensor, receiving unit 60 may transmit information to controller 40 indicating the same. Controller 40 may be configured to control display 22 and/or indicator light(s) 32 to alert the user that the key blank 502 has been inserted into slot 26 with an improper orientation. In these embodiments, a graphical user interface may be presented to the user on display 22 with a message such as "TURN YOUR KEY BLANK OVER!" or the like that informs the user to insert the key blank 502 with a different orientation. In some embodiments, machine 12 via controller 40 may additionally or alternatively provide audible information or other types of visual information (such as a red light on indicator light(s) 32) to alert the user of improper insertion. When prompted, the user may withdraw key blank 502 from slot 26, correct the orientation (i.e., right-side-up), and insert the key blank again to continue the cutting process.

Figure 8B:
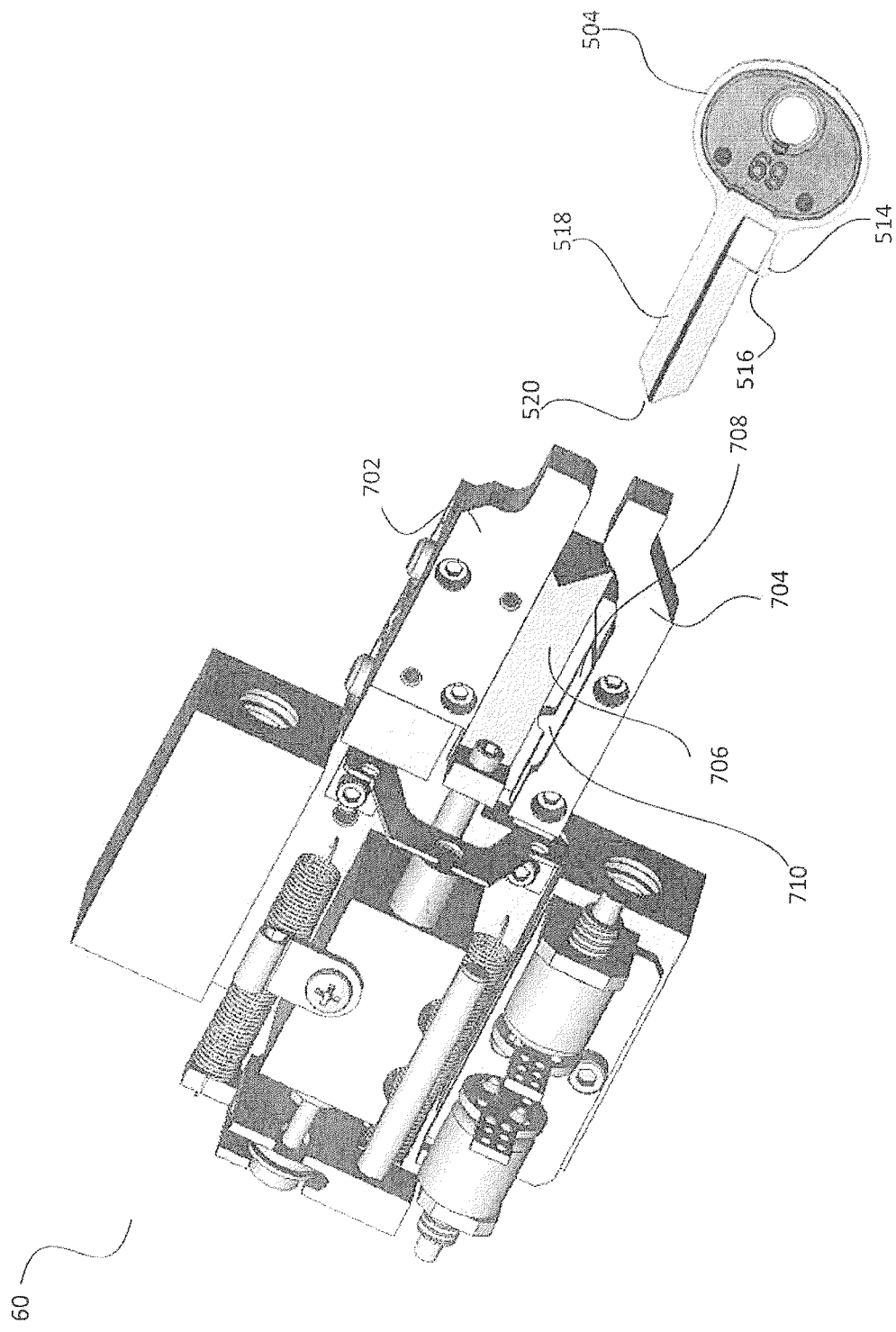

FIG. 8B presents an illustration of an embodiment similar to that described above for FIG. 8A, but with a key blank similar to key blank 504 with a centered (i.e. non-offset) tip 520. Jaws 702 and 704 are substantially the same as described in FIGS. 7A-7B, as are end stop 706 and shield 708.

With the configuration of receiving unit 60 depicted in FIG. 8B, detection of proper orientation of key blank 504 may proceed as follows. If a key blank with a centered tip 520, like key blank 504, is properly inserted into receiving unit 60 through slot 26 (i.e., with spine 518 engaged with fixed jaw 702 and the other side of the shank (to be cut) engaged with movable jaw 704), then tip 520 will interface with the recess in end stop 706 while the key blank 504 is continually inserted until locating surface 516 on shoulder 514 contacts the face of movable jaw 704. In the embodiment illustrated in FIG. 8B, where end stop 706 is the plunger of a potentiometer, the plunger would be displaced linearly by a known amount and the proper length of the shank of key blank 504 would be registered by the potentiometer associated with receiving unit 60.

If, however, key blank 504 (with centered tip 520) is inserted upside down into slot 26 by the user of machine 12 (i.e., with spine 518 engaged with movable jaw 704 instead of fixed jaw 702, and the other side of the shank (to be cut) engaged with fixed jaw 702 instead of movable jaw 704), then locating surface 516 will contact the face of fixed jaw 702 instead of movable jaw 704. In some embodiments, machine 12 and receiving unit 60 may be configured, via controller 40, to detect (via sensors, electromagnetic signals, or other means) that locating surface 516 is not in proper contact with movable jaw 704, and may transmit an audible or visual indication to the user through display 22 and/or indicator light(s) 32. Similarly, machine 12 and receiving unit 60 may be configured, via controller 40, to detect (via sensors, electromagnetic signals, or other means) that spine 518 is not in proper contact with fixed jaw 702, and may transmit a similar audible or visual indication to the user.

Insertion of key blank 504 in an improper (e.g. upside down) orientation, with the resulting contact of locating surface 516 with fixed jaw 702 instead of movable jaw 704, will result in an associated measurement of an increased length of the key blade by an associated potentiometer (or other such sensor) of about 0.06" (1.524 mm), which is within the detectable range of potentiometers known in the art. The increased measurement is due to the configuration of receiving unit 60 in FIGS. 7A-7B, in which fixed jaw 702 is about 0.06" (1.524 mm) shorter than movable jaw 704. Since locating surface 518 (and therefore end stop 706) will travel an additional 0.06" (1.524 mm) if it contacts fixed jaw 702 rather than movable jaw 704, the potentiometer will register this additional distance based on the further linear displacement of end stop 706. Upon detecting a different-than-expected length using the potentiometer or other sensor, receiving unit 60 may transmit information to controller 40 indicating the same. Controller 40 may be configured to control display 22 and/or indicator light(s) 32 to alert the user that the key blank 504 has been inserted into slot 26 with an improper orientation. In these embodiments, a graphical user interface may be presented to the user on display 22 with a message such as "TURN YOUR KEY BLANK OVER!" or the like that informs the user to insert the key blank 504 with a different orientation. In some embodiments, machine 12 via controller 40 may additionally or alternatively provide audible information or other types of visual information (such as a red light on indicator light(s) 32) to alert the user of improper insertion. When prompted, the user may withdraw key blank 504 from slot 26, correct the orientation (i.e., right-side-up), and insert the key blank again to continue the cutting process.

Figure 9:
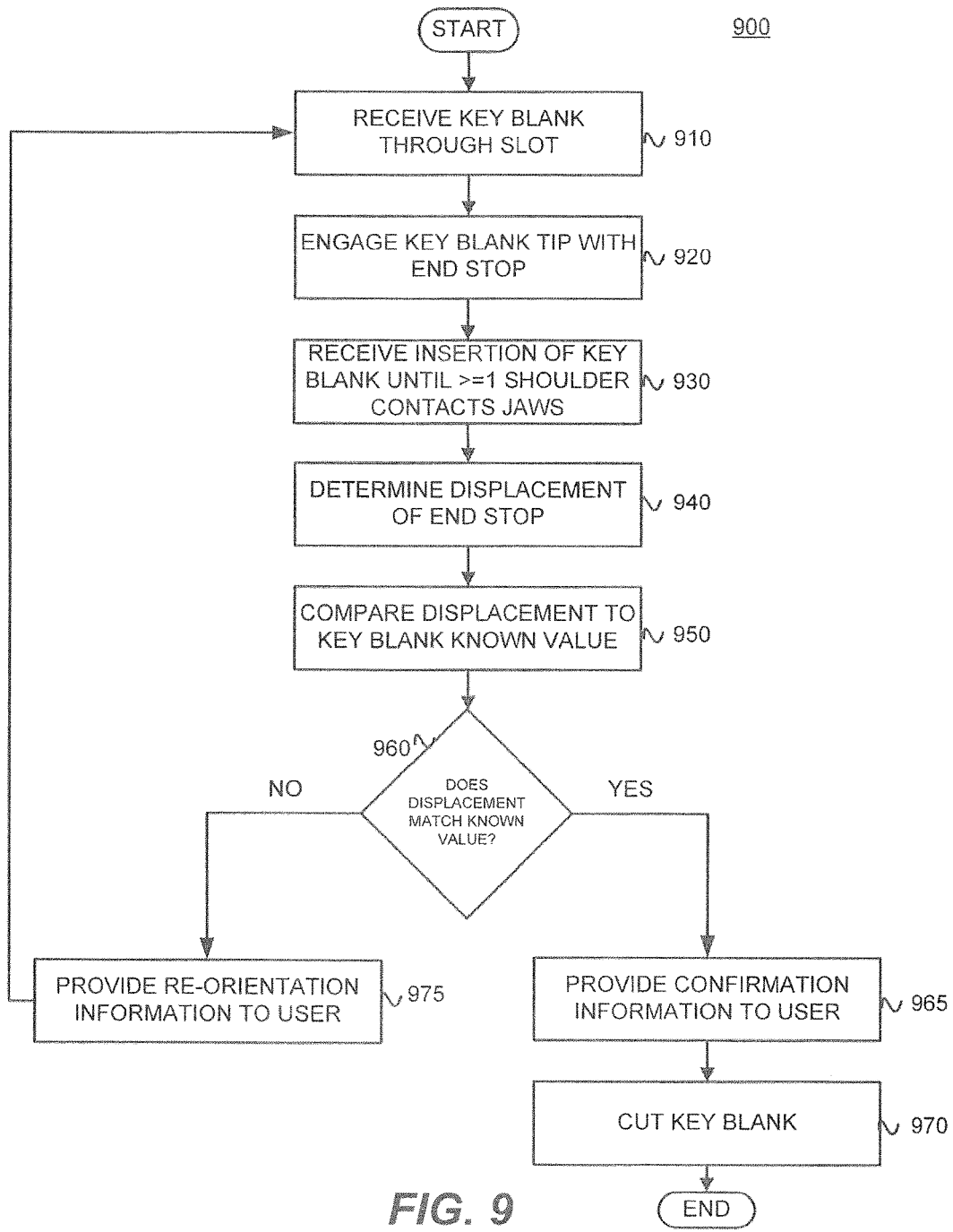
FIG. 9 is a flowchart depicting an exemplary key blank orientation process, consistent with disclosed embodiments.

FIG. 9 is a flowchart depicting an exemplary key blank orientation process 900, consistent with disclosed embodiments. Although it is to be understood that process 900 may be performed by any configuration of components as described above, for purposes of illustration process 900 will be described in association with the embodiments described in FIGS. 6-8B.

A user of center 10 and machine 12 may approach machine 12 to duplicate a key. After identifying a master key of the user inserted in slot 24 via identification module 34, machine 12 may prompt the user to insert a corresponding key blank (such as key blank 502 or 504) in order to duplicate the bit pattern of the identified master key. Machine 12 may receive an inserted key blank from the user into receiving unit 60 through slot 26 (Step 910).

As the key blank 502/504 passes through slot 26, beveled edges and walls of slot 26 induce the shank of key blank 502/504 to engage jaws 702 and 704. As part of this process, receiving unit 60 may engage the tip of the key blank 512/520 with end stop 706 (Step 920).

As the user continues to insert key blank 502/504 through slot 26, with the tip 512/520 engaged with end stop 706, receiving unit 60 (via controller 40) may be configured to continue to receive the insertion of the shank of the key blank 502/504 until at least one shoulder of the key blank contacts one or more of jaws 702 and 704 (Step 930). In some embodiments (in which the key blank 502/504 is inserted in the proper orientation), locating surface 508/516 contacts movable jaw 704. In other embodiments, where the key blank 502/504 is not inserted in the proper orientation, contact between locating surface 508/516 and movable jaw 704 may not take place.

Machine 12, via controller 40, may determine the linear displacement of end stop 706 from its original or home position (Step 940). Displacement of end stop 706 may proceed until other components come into contact. For example, shoulders 506a/506b/514 (and associated locating surfaces 508/516) may contact either fixed jaw 702 or movable jaw 704. Once this contact is made, continued linear displacement of end stop 706 may proceed, and the cumulative linear displacement may be measured or detected by receiving unit 60. This detection may occur via a potentiometer (for example, if end stop 706 is the plunger of the potentiometer), or any other suitable sensor known in the art.

Receiving unit 60, via controller 40, may compare the detected linear displacement of the end stop to a known value for the inserted key blank 502/504 (Step 950). Machine 12 may be configured to identify the key blank 502/504 before or during insertion into the machine through slot 26, such as via reader 30. Once identified, controller 40 may retrieve information associated with a known length of the shank of the identified key blank 502/504. This information may be received from a database stored within machine 12 accessible by controller 40, or may be retrieved from a remote location. In some embodiments, the information may be presented on or with the key blank in a form that can be detected and processed by reader 30, such as a bar code or QR code.

Receiving unit 60, via controller 40, may determine whether or not the detected linear displacement of end stop 706 approximately matches the known value information for the identified key blank (within acceptable tolerances) (Step 960). If the values do match within acceptable values (which may be predetermined) (Step 960: YES), then machine 12, via controller 40, may be configured to provide confirmation information to the user (Step 965). The confirmation information may be audible or visual, and may include information such as "THANKS," "YOUR KEY BLANK IS READY," or the like. The information may be displayed on display 22 in word or pictorial form. Additionally or alternatively, a green light or similar signal may be displayed to the user via indicator light(s) 32. Machine 12 may proceed to cut the key blank 502/504 to form a duplicate of the master key using fabrication unit 36 (Step 970). In some embodiments, the information provided to the user in Step 965 may simply be the typical information and/or commands that would typically be displayed to the user during usual key duplication at Step 970.

If the detected displacement of end stop 706 does not match the known value information for the identified key blank (Step 960: NO), then machine 12, via controller 40, may be configured to provide re-orientation information to the user (Step 975). The re-orientation information may be audible or visual, and may include information such as "TURN YOUR KEY BLANK OVER!" or the like. The information may be displayed on display 22 in word or pictorial form. Additionally or alternatively, a red, yellow, or similar signal may be displayed to the user via indicator light(s) 32. Process 900 may then restart at Step 910 with the user re-inserting key blank 502/504 with the proper orientation.

The disclosed embodiments enable deployment of a low-cost, self-service key duplication machine that is operable by an untrained operator with high accuracy. By detecting whether or not an inserted key blank is oriented properly without the use of complex cameras, lasers, etc., deployed key duplication machines can be smaller in size, manufactured and a lower cost, and will incur lower maintenance costs. Keys cut by such a machine will have fewer miscuts and will engender higher user satisfaction and return purchases, since the machine will not permit the key blank to be cut unless it is oriented properly.

It will be apparent to those skilled in the art that various modifications and variations can be made to the disclosed key making machine. Other embodiments will be apparent to those skilled in the art from consideration of the specification and practice of the disclosed key making machine. It is intended that the specification and examples be considered as exemplary only, with a true scope being indicated by the following claims and their equivalents.

What is claimed is:

1. A key blank receiving module for a key duplication system, comprising:
   a slot configured to receive a shank of a key blank;
   two opposing jaws configured to engage the received key blank, the two jaws including a fixed jaw and a movable jaw, the fixed jaw being shorter in length relative to the movable jaw;
   an end stop configured to receive a tip of the shank of the key blank as the tip is inserted through the slot, the end stop being capable of linear displacement via insertion of the key blank;
   a shield extending along a length of the end stop; and
   one or more sensors configured to detect the linear displacement of the end stop.

2. The key blank receiving module of claim 1, wherein the shield includes one or more mechanical implements or features configured to prevent contact between the end stop and other components of the key blank receiving module.

3. The key blank receiving module of claim 2, wherein the feature is selected from the group consisting of a side guide that prevents movement of the end stop in a longitudinal direction within the key blank receiving module and a protrusion that prevents movement of the end stop in a transverse direction within the key blank receiving module.

4. The key blank receiving module of claim 1, wherein at least one of the one or more sensors is a potentiometer.

5. The key blank receiving module of claim 4, wherein the end stop is a plunger of the potentiometer.

6. The key blank receiving module of claim 5, wherein the end stop comprises a recess configured to receive the tip of the received key blank.

7. The key blank receiving module of claim 6, wherein the received key blank has an offset tip, and the recess of the end stop is shaped like the offset tip.

8. The key blank receiving module of claim 1, wherein the end stop comprises a recess configured to receive the tip of the received key blank.

9. The key blank receiving module of claim 8, wherein the received key blank has an offset tip, and the recess of the end stop is shaped like the offset tip.

10. A key duplication system, comprising:
    a key blank receiving module, wherein the key blank receiving module comprises:
      a slot configured to receive only a shank of a key blank;
      two opposing jaws configured to engage the received key blank, the two jaws including a fixed jaw and a movable jaw, the fixed jaw being shorter in length relative to the movable jaw;
      an end stop configured to receive a tip of the shank of the key blank as the tip is inserted through the slot, the end stop being capable of linear displacement via insertion of the key blank;
      a shield extending along a length of the end stop;
      one or more sensors configured to detect the linear displacement of the end stop; and
      a display for displaying information to a user; and
    a controller configured to control the key receiving module and the display.

11. The key duplication system of claim 10, wherein the shield includes one or more mechanical implements or features configured to prevent contact between the end stop and other components of the key blank receiving module.

12. The key duplication system of claim 10, wherein at least one of the one or more sensors is a potentiometer.

13. The key duplication system of claim 12, wherein the end stop of the key blank receiving module is a plunger of the potentiometer.

14. The key duplication system of claim 13, wherein the end stop of the key blank receiving module comprises a recess configured to receive the tip of the received key blank.

15. The key blank receiving module of claim 14, wherein the received key blank has an offset tip, and the recess of the end stop is shaped like the offset tip.

* * * * *